United States Patent
Davis et al.

(10) Patent No.: US 11,662,465 B2
(45) Date of Patent: May 30, 2023

(54) LIDAR WITH TILTED AND OFFSET OPTICAL CAVITY

(71) Applicant: Waymo LLC, Mountain View, CA (US)

(72) Inventors: Ryan Davis, Woodside, CA (US); Blaise Gassend, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 1187 days.

(21) Appl. No.: 16/237,427

(22) Filed: Dec. 31, 2018

(65) Prior Publication Data
US 2020/0142064 A1    May 7, 2020

Related U.S. Application Data

(60) Provisional application No. 62/753,960, filed on Nov. 1, 2018.

(51) Int. Cl.
*G01S 17/26* (2020.01)
*G02B 27/09* (2006.01)
(Continued)

(52) U.S. Cl.
CPC .............. *G01S 17/26* (2020.01); *G01S 17/00* (2013.01); *G02B 26/12* (2013.01);
(Continued)

(58) Field of Classification Search
None
See application file for complete search history.

(56) References Cited

U.S. PATENT DOCUMENTS

| 7,746,449 | B2 | 6/2010 | Ray et al. |
| 8,836,922 | B1* | 9/2014 | Pennecot ............. G01S 7/4815 |
| | | | 356/9 |

(Continued)

FOREIGN PATENT DOCUMENTS

| JP | 2010066101 A | 3/2010 |
| KR | 101763165 | 8/2017 |
| KR | 20180089625 | 8/2018 |

OTHER PUBLICATIONS

International Searching Authority, International Search Report and Written Opinion dated Feb. 7, 2020, issued in connection with International Patent Application No. PCT/US2019/057384, filed on Oct. 22, 2019, 11 pages.

*Primary Examiner* — Hovhannes Baghdasaryan
(74) *Attorney, Agent, or Firm* — McDonnell Boehnen Hulbert & Berghoff LLP

(57) ABSTRACT

The present disclosure relates to systems and methods that facilitate a scanning light detection and ranging (LIDAR) device configured to provide an asymmetric illumination pattern. An example system includes a rotatable base configured to rotate about a first axis and a mirror assembly. The mirror assembly is configured to rotate about a second axis, which is substantially perpendicular to the first axis. The system also includes an optical cavity coupled to the rotatable base. The optical cavity includes a photodetector and a photodetector lens arranged so as to define a light-receiving axis. The optical cavity also includes a light-emitter device and a light-emitter lens arranged so as to define a light-emission axis. At least one of the light-receiving axis or the light-emission axis forms a tilt angle with respect to the first axis.

17 Claims, 14 Drawing Sheets

(51) Int. Cl.
*G02B 26/12* (2006.01)
*G01S 17/00* (2020.01)

(52) U.S. Cl.
CPC ..... *G02B 27/0955* (2013.01); *G02B 27/0972* (2013.01); *G02B 27/0977* (2013.01)

(56) References Cited

U.S. PATENT DOCUMENTS

| | | |
|---|---|---|
| 9,188,674 B2 | 11/2015 | Suzuki et al. |
| 9,612,436 B1 | 4/2017 | Hoffman et al. |
| 2011/0164783 A1 | 7/2011 | Hays et al. |
| 2015/0092184 A1* | 4/2015 | Schultz .................. G01S 17/42 |
| | | 359/219.1 |
| 2016/0274222 A1 | 9/2016 | Yeun |
| 2018/0188367 A1* | 7/2018 | Lundquist ............ G01S 7/4816 |
| 2018/0231644 A1 | 8/2018 | Gassend et al. |

* cited by examiner

LIDAR WITH TILTED AND OFFSET OPTICAL CAVITY

CROSS-REFERENCE TO RELATED APPLICATION

The present application claims the benefit of U.S. Patent Application No. 62/753,960, filed Nov. 1, 2018, the content of which is herewith incorporated by reference.

BACKGROUND

Light Detection and Ranging (LIDAR or lidar) systems emit light into the environment so as to determine information about objects based on emitted light that is reflected from those objects. LIDAR range and sensitivity is fundamentally constrained by the amount of energy emitted into the environment. That is, increasing the amount of energy per light pulse or continuous light signal generally enables unambiguous detection of objects at longer ranges. However, the laser emissions are themselves constrained by laser safety considerations that limit accessible laser emissions as well as by operational parameters of the laser light source that limit its average light pulse power.

Conventional LIDAR systems may scan laser light over a nominal vertical angle range of +/−7 degrees (pitch). At a distance of 100 meters from the LIDAR system, such an angle range may scan a vertical extent of approximately 24 meters in height.

SUMMARY

The present disclosure generally relates to light detection and ranging (LIDAR) systems, which may be configured to obtain information about an environment. Such LIDAR devices may be implemented in vehicles, such as autonomous and semi-autonomous automobiles, trucks, motorcycles, and other types of vehicles that can move within their respective environments.

In a first aspect, a system is provided. The system includes a rotatable base configured to rotate about a first axis. The system also includes a mirror assembly that includes a plurality of reflective surfaces and is configured to rotate about a second axis. The second axis is substantially perpendicular to the first axis. The system also includes an optical cavity coupled to the rotatable base. The optical cavity includes a photodetector and a photodetector lens arranged so as to define a light-receiving axis. The optical cavity includes a light-emitter device and a light-emitter lens arranged so as to define a light-emission axis. At least one of the light-receiving axis or the light-emission axis forms a tilt angle with respect to the first axis. The light-emitter device is configured to emit light pulses that interact with the mirror assembly such that the light pulses are directed into a plurality of disjoint fields of view.

In a second aspect, a method is provided. The method includes selecting a desired asymmetric emission pattern to be emitted from a LIDAR system. The LIDAR system includes an optical cavity, a rotatable base, and a mirror assembly. The method also includes adjusting a tilt angle of the optical cavity with respect to the rotatable base and the mirror assembly so as to provide the desired asymmetric emission pattern. The rotatable base is configured to rotate about a first axis. The mirror assembly is configured to rotate about a second axis. The second axis is substantially perpendicular to the first axis. The optical cavity includes a photodetector and a photodetector lens arranged so as to define a light-receiving axis. The optical cavity further includes a light-emitter device and a light-emitter lens arranged so as to define a light-emission axis. The tilt angle includes an angle provided between at least one of the light-receiving axis or the light-emission axis with respect to the first axis. The method additionally includes causing the LIDAR system to emit light pulses according to the desired asymmetric emission pattern.

In a third aspect, a method is provided. The method includes transmitting and receiving, using a LIDAR system, light pulses through a first optical window over a first range of angles. The method also includes transmitting and receiving, using the LIDAR system, light pulses through a second optical window over a second range of angles. The LIDAR system includes an optical cavity, a rotatable base, and a mirror assembly. The rotatable base is configured to rotate about a first axis. The mirror assembly is configured to rotate about a second axis. The second axis is substantially perpendicular to the first axis. The optical cavity includes a photodetector and a photodetector lens arranged so as to define a light-receiving axis. The optical cavity further includes a light-emitter device and a light-emitter lens arranged so as to define a light-emission axis. At least one of the light-receiving axis or the light-emission axis forms a non-zero tilt angle with respect to the first axis.

Other aspects, embodiments, and implementations will become apparent to those of ordinary skill in the art by reading the following detailed description, with reference where appropriate to the accompanying drawings.

DETAILED DESCRIPTION

Figure 1:
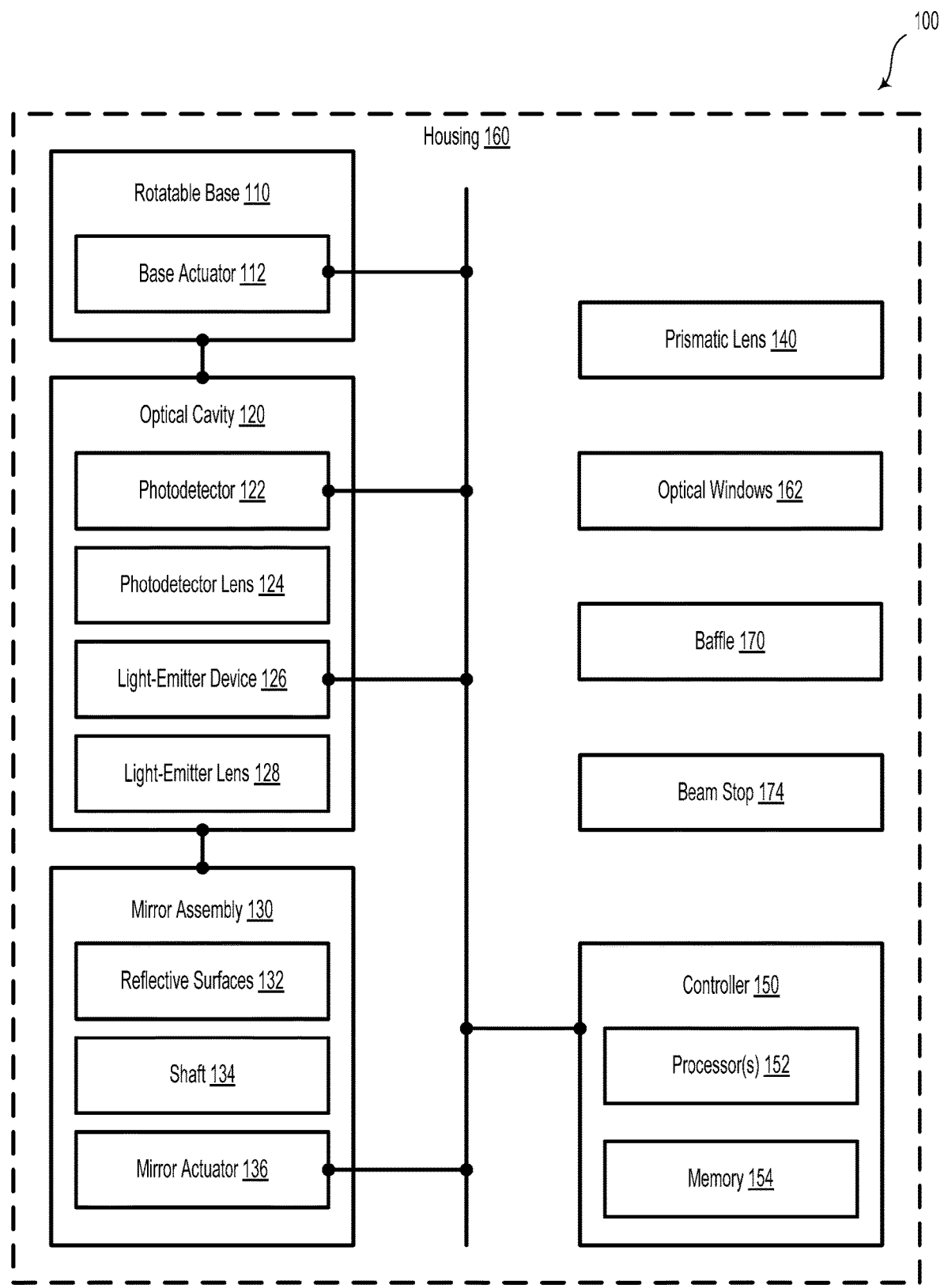
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A LIDAR system includes a rotatable mirror assembly and an optical cavity. The optical cavity includes at least one light-emitter device, at least one photodetector, and respective optical elements (e.g., lenses). The light-emitter device may emit light pulses along a light-emission axis that interact with the rotatable mirror assembly so that the light pulses are redirected into an environment. Light pulses that reflect back toward the LIDAR from the environment can be received by the photodetector along a light-receiving axis so as to determine a distance to target (range) and form a point cloud based on the distance determinations. In some embodiments, the light pulses could be emitted through two windows located at opposing sides of the LIDAR system housing.

In an example embodiment, the optical cavity could be coupled to a rotatable base, which is configured to rotate about a first axis of rotation that is substantially vertical. The mirror assembly could be configured to rotate about a second axis of rotation that is coincident and substantially perpendicular to the first axis of rotation. In such scenarios, the optical cavity could be coupled to the rotatable base such that either or both of the light-emission axis or the light-receiving axis forms an angle with respect to the first axis of rotation and possibly such that the light-emission axis and/or the light-receiving axis do not intersect the second axis of rotation.

In other words, some or all elements of the optical cavity could be tilted and offset with respect to the first axis. In an example embodiment, tilting the optical cavity could be performed so as to adjust a field of view "balance" between two sides of the LIDAR system. That is, tilting the optical cavity may increase the field of view on one side of the spinning mirror of the LIDAR system at the expense of the field of view on the second side. Furthermore, offsetting the optical cavity with respect to the first axis may further adjust a balance of received optical power between two sides of the LIDAR system. As the LIDAR system spins about the first axis, the field of view through a first side and the field of view through a second side could overlap at various ranges and/or locations in the environment. The spatially overlapping regions could have effectively twice the resolution as compared to regions without spatially overlapping fields of view. In some embodiments, the tilt and offset could be adjusted to allocate higher resolution regions within angle ranges generally directed at longer range targets (e.g., toward the horizon, etc.). In some cases, the tilt/offset may provide that only one side of the LIDAR system could be illuminating the ground at one time. In an example embodiment, the tilt angle of the optical cavity could be between 15 and 30 degrees; however, other tilt angles are possible and contemplated. As an example, the light-emission axis and/or the light-receiving axis could pass within between 0-5 mm from the second axis of rotation. The tilt angle and the offset distance could be selected based on, for example, a desired light emission pattern. It will be understood that while embodiments described herein may be illustrated and/or described as having tilt angle and/or offset distances with respect to a two-dimensional plane perpendicular to the second axis of rotation (e.g., the axis about which the mirror rotates), tilt angles and/or offset distances defined in three dimensions are possible and contemplated. For example, the tilt angle of the optical cavity could be expressed in terms of an elevation angle component and an azimuthal angle component. Similarly, the offset distance could be expressed in terms of an x-component and a z-component. Alternatively, the offset distance could be expressed in terms of a distance and an azimuth angle as compared to an untilted optical cavity. Other ways to express three-dimensional axes and/or spatial locations are possible and contemplated. In some embodiments, the desired light emission pattern could be asymmetric (e.g., in light pulse coverage, resolution, etc.) when comparing light emission through the first window as compared to light emission through the second window.

In some embodiments, a further optical element (e.g., a prismatic lens) could be utilized to tilt the respective beams of transmitted and received light pulses. As described herein, the prismatic lens could be configured to tilt light pulses into and out of the axis of the optical cavity. In some embodiments, such prismatic lens arrangements could reduce the overall size and/or volume of the LIDAR system.

The LIDAR system disclosed herein could be used in machine vision and/or perception applications. Additionally or alternatively, in some embodiments, the LIDAR system could be utilized for transportation applications (e.g., semi- or fully-autonomous vehicles) or robotic, security, and/or warehouse-related applications.

II. Example Systems

FIG. 1 illustrates a system 100, according to an example embodiment. System 100 could represent at least a portion of a LIDAR system. System 100 includes a rotatable base 110 configured to rotate about a first axis. The rotatable base 110 could include, or could be coupled to, a base actuator 112. In some embodiments, the base actuator 112 could be a direct current (DC) motor or another type of rotational actuator. In some examples, the rotatable base 110 could be configured to rotate about the first axis at between 200 revolutions per minute (RPM) and 800 RPM. It will be understood that the rotatable base 110 could operate at other rotational speeds. In some embodiments, the base actuator 112 could be controlled by the controller 150 to rotate at a desired rotational speed. In some embodiments, system 100 need not include a rotatable base. In such scenarios, one or more elements of the system 100 may be arranged with respect to the first axis. However, in such cases, elements of the system 100 need not rotate about the first axis. Accordingly, in such embodiments, system 100 could be utilized in line-scanning applications, among other possibilities.

System 100 also includes a mirror assembly 130. The mirror assembly 130 is configured to rotate about a second axis. In such scenarios, the second axis could be substantially perpendicular to the first axis (e.g., within 0 to 10 degrees of perpendicular). In some embodiments, the mirror assembly 130 includes a plurality of reflective surfaces 132. Additionally, the mirror assembly 130 could include a shaft 134 and a multi-sided mirror that is configured to mount the plurality of reflective surfaces 132. The mirror assembly 130 could also include a mirror actuator 136, which could be a DC motor or another type of rotational actuator. In such scenarios, the mirror actuator 136 is coupled to the shaft 134. In some embodiments, the mirror actuator 136 could be configured to rotate the multi-sided mirror about the second axis at a rotational speed between 20,000 RPM and 40,000 RPM. It will be understood that the mirror actuator 136 could be operated at various rotational speeds or a desired rotational speed, which could be controlled by the controller 150.

In such scenarios, the plurality of reflective surfaces 132 could include three reflective surfaces arranged symmetrically about the second axis such that at least a portion of the mirror assembly 130 has a triangular prism shape. It will be understood that the mirror assembly 130 could include more or less than three reflective surfaces. Accordingly, the mirror assembly 130 could be shaped as a multi-sided prism shape having more or less than three reflective surfaces. For example, the mirror assembly 130 could have four reflective surfaces. In such scenarios, the mirror assembly 130 could have a square or rectangular cross-section.

System 100 additionally includes an optical cavity 120 coupled to the rotatable base 110. In such scenarios, the optical cavity 120 includes a photodetector 122 and a photodetector lens 124 that are arranged so as to define a light-receiving axis. As such, an arrangement of the photodetector 122 and the photodetector lens 124 provide the light-receiving axis. In some embodiments, the photodetector 122 comprises a silicon photomultiplier (SiPM). However, other types of photodetectors, such as avalanche photodiodes (APDs) are contemplated. Furthermore, while photodetector 122 is described in the singular sense herein, it will be understood that systems incorporating multiple photodetectors, such as a focal plane array, are also possible and contemplated.

In example embodiments, the photodetector 122 could provide an output signal to the controller 150. For example, the output signal could include information indicative of a time of flight of a given light pulse toward a given portion of the field of view of the environment. Additionally or alternatively, the output signal could include information indicative of at least a portion of a range map or point cloud of the environment.

The system 100 also includes a light-emitter device 126 and a light-emitter lens 128 that are arranged so as to define a light-emission axis. The light-emitter device 126 could include a laser diode or another type of light-emitter. In some embodiments, the light-emitter device 126 could be coupled to a laser pulser circuit operable to cause the light-emitter device 126 to emit one or more laser light pulses. In such scenarios, the laser pulser circuit could be coupled to a trigger source, which could include controller 150. The light-emitter device 126 could be configured to emit infrared laser light (e.g., having a wavelength between 800-1600 nanometers). However, other wavelengths of light are possible and contemplated.

In example embodiments described herein, at least one of the light-receiving axis or the light-emission axis forms a non-zero tilt angle with respect to the first axis. In some embodiments, the tilt angle could be between 15 degrees and 30 degrees with respect to the first axis. Alternatively, the tilt angle could be between 1 degree and 15 degrees or between 30 degrees and 45 degrees. However, other tilt angles are contemplated and possible within the context of the present disclosure.

In some embodiments, the light-emitter device 126 is configured to emit light pulses (by way of light-emitter lens 128) that interact with the mirror assembly 130 such that the light pulses are redirected toward an environment (e.g., an external environment of a vehicle). In such scenarios, at least a portion of the light pulses are reflected back toward the system 100 and received by the photodetector 122 (by way of photodetector lens 124) so as to determine at least one of a range or a point cloud.

In example embodiments, the light-receiving axis and the light-emission axis are parallel to one another.

The system 100 includes a controller 150. The controller 150 includes at least one of a field-programmable gate array (FPGA) or an application-specific integrated circuit (ASIC). Additionally or alternatively, the controller 150 may include one or more processors 152 and a memory 154. The one or more processors 152 may be a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include, or take the form of, one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of system 100. As such, the memory 154 may include program instructions to perform or facilitate some or all of the functionalities described herein.

In various embodiments, the system 100 includes a housing 160 having a plurality of optical windows 162. The optical windows 162 could be substantially transparent to wavelengths of light such as the emitted light pulses. For example, the optical windows 162 could include transparent materials configured to transmit the emitted light pulses with a transmission efficiency greater than 80%. In some embodiments, the housing 160 could include two elongate optical windows. The optical windows 162 could be arranged on substantially opposite surfaces of the housing 160. In such scenarios, the light pulses could be emitted toward the environment by optical transmission through the plurality of optical windows 162.

In some embodiments, system 100 includes a prismatic lens 140 configured to refract the light pulses. The prismatic lens 140 could include an optical element (e.g., a prism lens). In some embodiments, the prismatic lens 140 could cause the light emitted from the optical cavity to be refracted at a different angle from the axis of the optical cavity. In such a manner, the optical axis of the beam coming out of the cavity itself can be decoupled from the angle of the optical cavity. Utilizing one or more prismatic lenses 140 could provide a shifted field of view to be asymmetric without having to adjust the optical cavity angle by the same amount. Thus, the prismatic lens 140 could provide the flexibility of smaller package size. For example, in some embodiments, the optical cavity 120 could remain substantially vertical (e.g., parallel with the first axis 111, but the beam coming out of the optical cavity 120 could be angled. Accordingly, optical cavities 120 that utilize prismatic lenses could provide all the benefits of an asymmetric field of view without widening, or otherwise physically rearranging, the space occupied by the optical cavity 120. In example embodiments, the prismatic lens 140 could replace the light-emitter lens 128. In other embodiments, the prismatic lens 140 could be utilized in addition to the light-emitter lens 128.

In some embodiments, a prismatic lens 140 could be utilized in place of the photodetector lens 124 or in conjunction with the photodetector lens 124. For example, the prismatic lens 140 could be used along the light-receiving axis 125 so as to modify the field of view from which light pulses could be received.

Additionally or alternatively, the light pulses emitted or transmitted through the plurality of optical windows 162 could form an asymmetric light emission pattern in the environment. For example, the light pulses emitted through a first window of the plurality of windows are emitted within a first emission angle range, and wherein the light pulses emitted through a second window of the plurality of windows are emitted within a second emission angle range, wherein the asymmetric light emission pattern is provided by the first emission angle range being different from the second emission angle range.

In various embodiments, the asymmetric light emission pattern could be provided by an arrangement of the optical cavity 120 with respect to the mirror assembly 130. For example, the optical cavity 120 could be arranged with respect to the mirror assembly 130 so that one or both of the light-receiving axis or the light-emission axis do not intersect the second axis (e.g., the axis about which the shaft 134 and the mirror assembly 130 are configured to rotate). In such scenarios, at least one of the light-receiving axis or the light-emission axis could pass within an offset distance from the second axis. As an example, the offset distance could be in a range between 0 millimeters and 10 millimeters. Alternatively, the offset distance could be in a range between 5 millimeters and 10 millimeters. Other offset distances are possible and contemplated within the scope of the present disclosure.

In some embodiments, the asymmetric light emission pattern could be adjusted based on a desired light emission pattern. For example, at least one of the offset distance or the tilt angle could be adjustable based on a desired light emission pattern. In such embodiments, the rotatable base 110 could include one or more adjustments or a further actuator configured to adjust the tilt angle and/or the offset distance.

In some embodiments, at least one of the offset distance or the tilt angle could be selected so as to adjust respective asymmetric angular ranges of a first portion of a field of view (e.g., illuminated via a first optical window) and a second portion of a field of view (e.g., illuminated via a second optical window) as compared to angular ranges of the symmetric fields of view of an untilted optical cavity. In such a scenario, the overlapping portions of the first and second portions of the field of view could have a combined resolution that is higher (e.g., approximately twice the resolution) than that of non-overlapping portions of the field of view.

In various embodiments, the system 100 could include at least one baffle 170. In such scenarios, the at least one baffle 170 could be configured to reduce stray light within the optical cavity 120. In an example embodiment, the baffle 170 could include an optically-opaque material disposed between the light-receiving axis and the light-emission axis.

The system 100 also includes at least one beam stop 174. The beam stop 174 may be optically opaque and could be configured to block light beams from being emitted toward the optical windows 162 and/or toward the environment. In some embodiments, the beam stop 174 may be arranged within the housing 160 substantially opposite the optical cavity 120.

When light emitted from the optical cavity 120 interacts with a corner of the mirror assembly 130 (e.g., at an intersection between two different reflective surfaces 132), the light is split into two parts, one emitted forward (e.g., toward a first optical window), and one emitted backward (e.g., toward a second optical window). To avoid ambiguous LIDAR signals due to the two emitted pulses, the beam stop 174 may be arranged near the top of the field of view so as to block at least one of the two beams from being emitted toward the environment. Furthermore, by adjusting the beam stop 174, the field of view at the top of one side can be expanded or extended at the expense of the field of view near the top of the other side. Accordingly, the beam stop 174 could be positioned to control the top limit of the field of view in a similar fashion as the cavity tilt/offset can adjust the bottom limit of the field of view.

In such scenarios, by adjusting the cavity tilt and top beam stop position, the field of view can be distributed between the two sides at the bottom and top of the field of view respectively.

Figure 2:
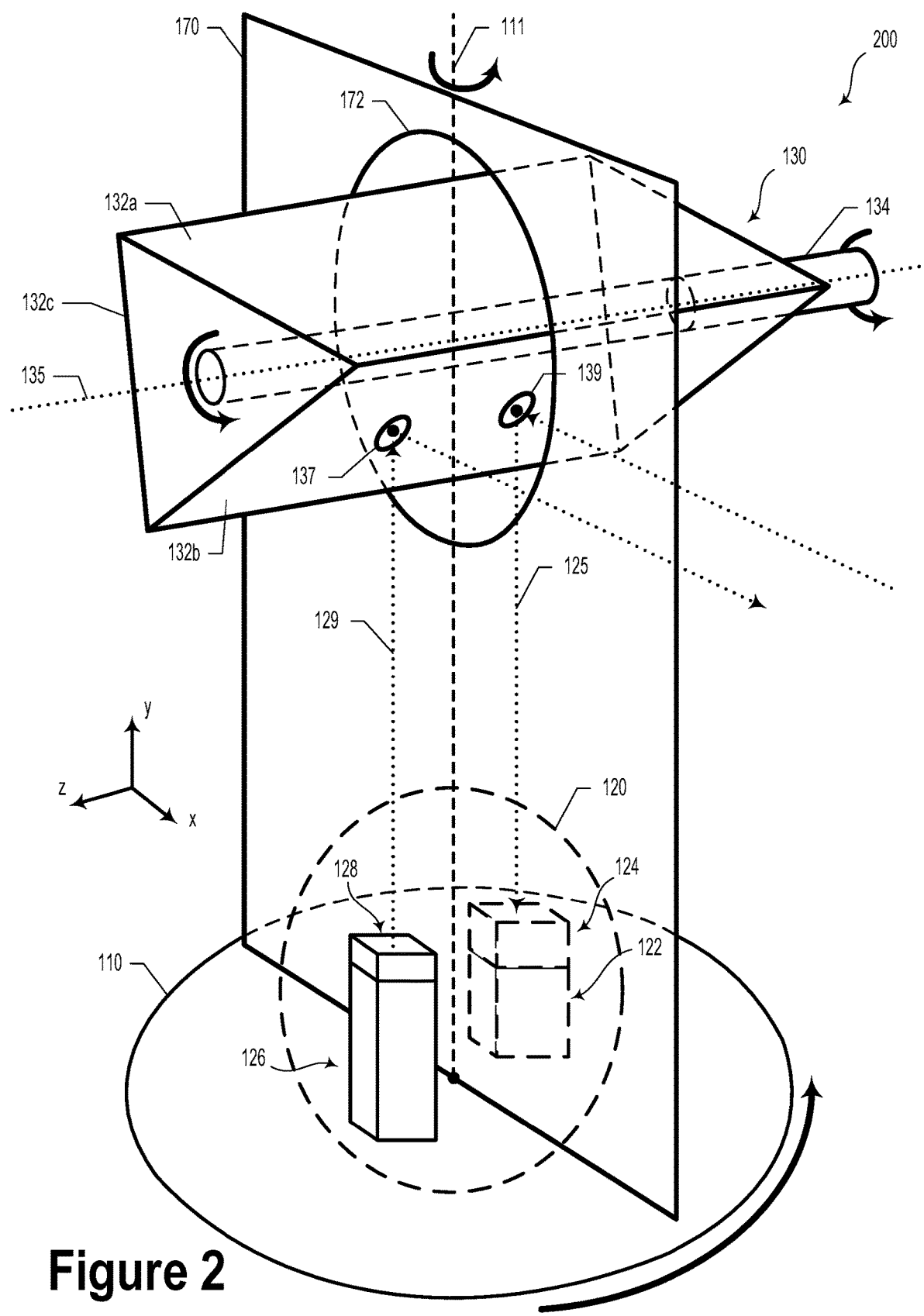
FIG. 2 illustrates a system, according to an example embodiment.

FIG. 2 illustrates an oblique view of system 200, according to an example embodiment. System 200 could be similar or identical to system 100, as illustrated and described in relation to FIG. 1. For example, system 200 could include a rotatable base 110. The rotatable base 110 could be configured to rotate about first axis 111. Furthermore, system 200 could include an optical cavity 120, which could include light-emitter device 126, light-emitter lens 128, photodetector 122, and photodetector lens 124. Furthermore, in some embodiments, system 200 could include a mirror assembly 130. The mirror assembly 130 could include a plurality of reflective surfaces 132a, 132b, and 132c and a shaft 134. The mirror assembly 130 could be configured to rotate about second axis 135.

In some embodiments, the light-emitter device 126 and the light-emitter lens 128 could form a light-emission axis 129. Light pulses emitted by the light-emitter device 126 could interact with reflective surface 132b at a transmission mirror region 137.

In some embodiments, the photodetector 122 and the photodetector lens 124 could form a light-receiving axis 125. Light pulses emitted by the light-emitter device 126 could be reflected or otherwise interact with the environment and could be observed at the photodetector 122 by way of a receiving mirror region 139.

As illustrated in FIG. 2, system 200 could include a baffle 170. The baffle 170 could include an opening 172 within which the mirror assembly 130 could be disposed. The opening 172 could be shaped so as to provide freedom for the mirror assembly 130 to rotate about the second axis 135.

Figure 3:
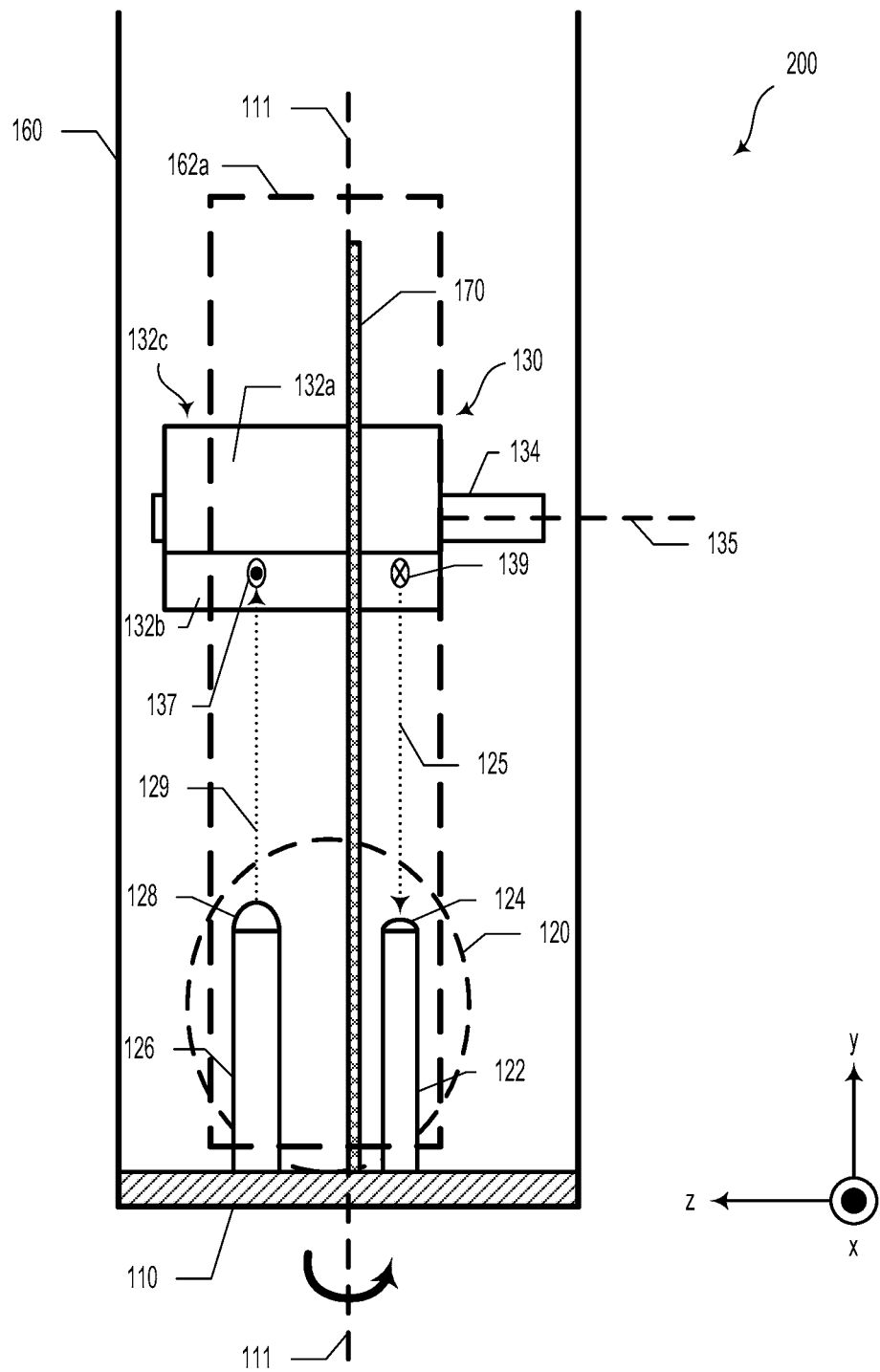
FIG. 3 illustrates a system, according to an example embodiment.

FIG. 3 illustrates a side view of system 200 along the −x direction, according to an example embodiment. As well as other elements described above in reference to FIG. 2, system 200 could additionally include a housing 160 and a plurality of optical windows, such as optical window 162a.

Figure 4:
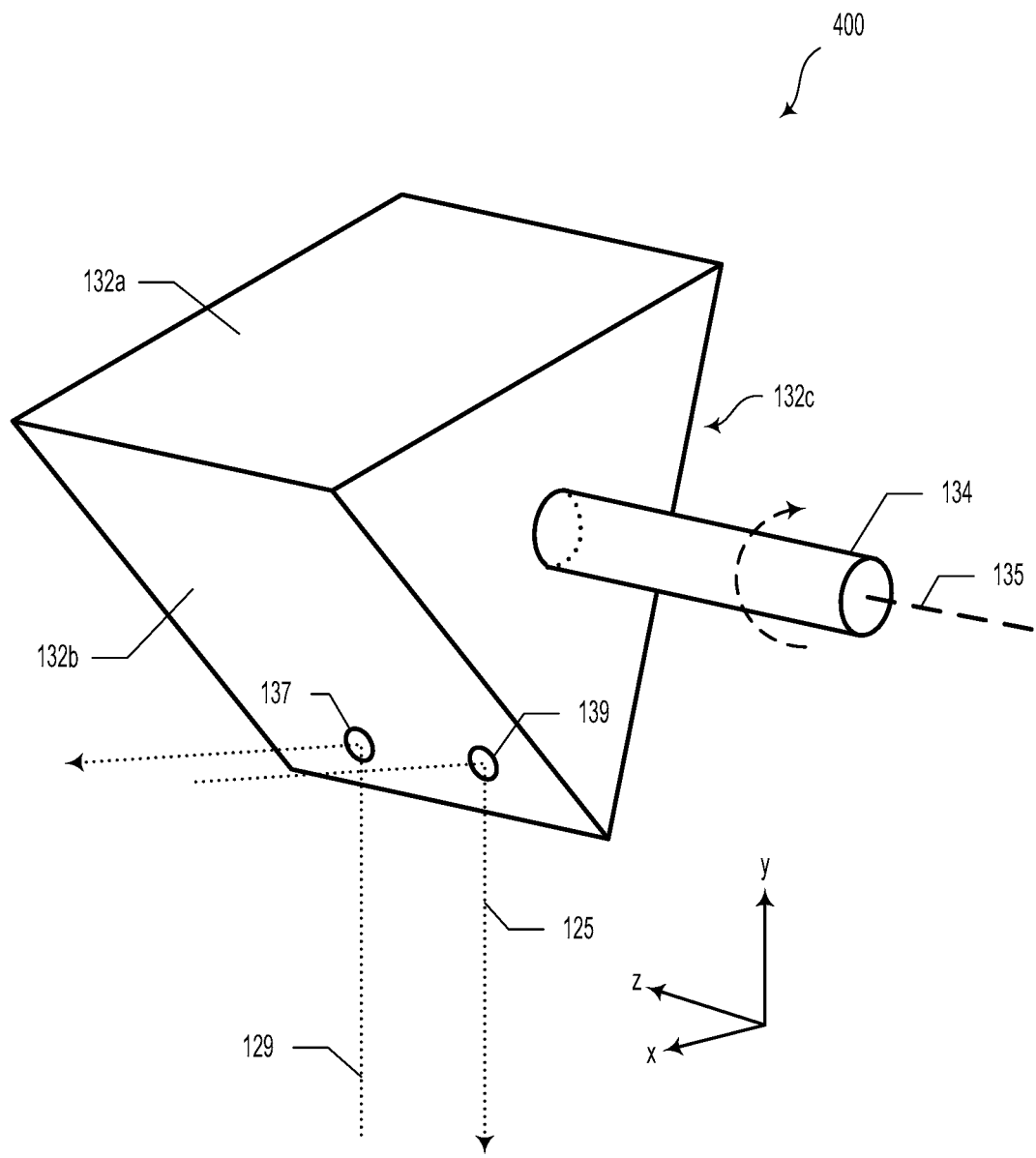
FIG. 4 illustrates a mirror assembly, according to an example embodiment.

FIG. 4 illustrates a mirror assembly 400, according to an example embodiment. Mirror assembly 400 could be similar or identical to mirror assembly 130. For example, mirror assembly 400 could include a plurality of reflective surfaces 132a, 132b, and 132c. The mirror assembly 400 could additionally include a shaft 134, which could be configured to rotate about second axis 135.

In some embodiments, the light-emitter device 126 could emit light pulses toward the mirror assembly 400 along a light-emission axis 129. A reflective surface 132b of the mirror assembly 400 could reflect such light pulses at a transmission mirror region 137 such that the light pulses are transmitted toward an external environment.

In such examples, light from the environment (e.g., reflected light pulses) could be reflected by the reflective surface 132b of the mirror assembly 400 at a receiving mirror region 139. In some embodiments, the received light could be directed along light-receiving axis 125 toward the photodetector 122.

Figure 5A:
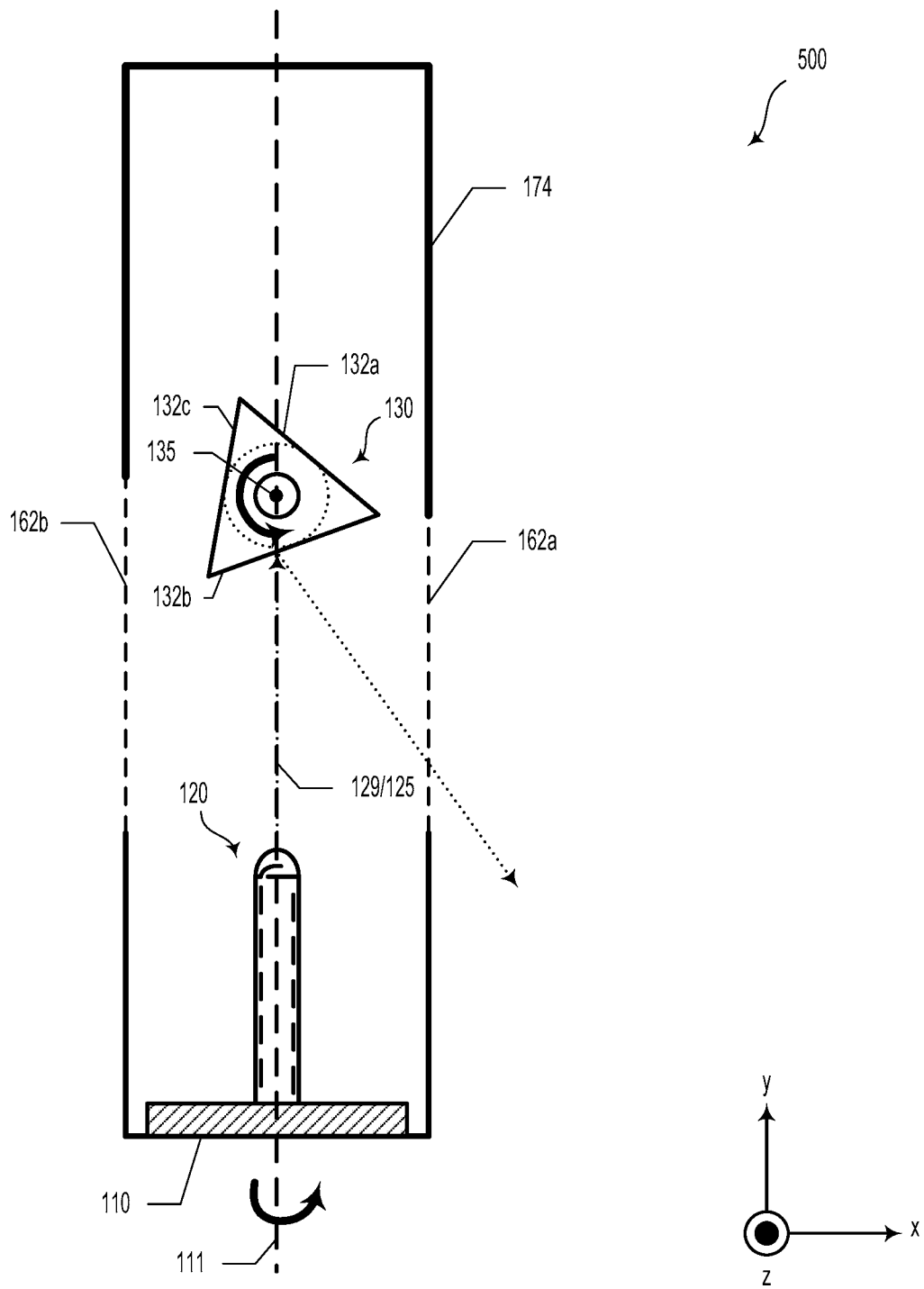
FIG. 5A illustrates a system configuration, according to an example embodiment.

FIG. 5A illustrates a system configuration 500, according to an example embodiment. The system configuration 500 could include similar or identical elements as system 100 and system 200, as illustrated and described in relation to FIGS. 1 and 2, respectively. For example, system configuration 500 could include the optical cavity 120 as being disposed such that light-emission axis 129 and/or light-receiving axis 125 are substantially parallel with the first axis 111.

In some embodiments, such an arrangement of the optical cavity 120 with respect to the first axis 111 could provide a substantially symmetric emission pattern in an external environment at least because light pulses emitted by the light-emitter device 126 are equally likely to be transmitted through a first optical window 162a to the right (+x direction) or through the second optical window 162b to the left (−x direction) based on the rotational position of the mirror assembly 130.

Figure 5B:
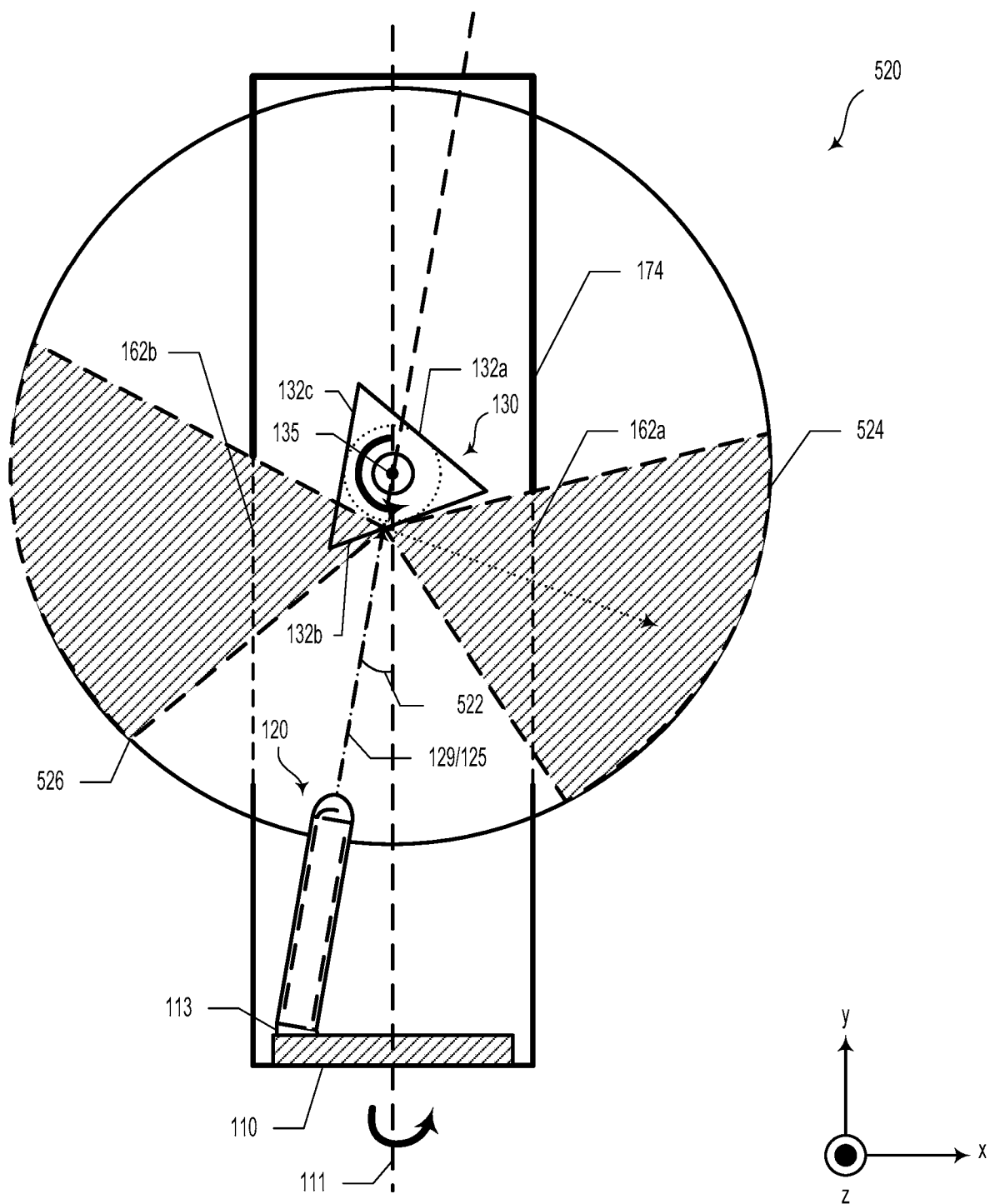
FIG. 5B illustrates a system configuration, according to an example embodiment.

FIG. 5B illustrates a system configuration 520, according to an example embodiment. System configuration 520 could include the optical cavity 120 being tilted with respect to the first axis 111 so as to form a tilt angle 522. In some embodiments, the tilt angle could be provided by an optical cavity base member 113. In some embodiments, the optical cavity base member 113 could include an adjustable stage. In other embodiments, the optical cavity base member 113 could include a shim or ramp-shaped structure. For example, the optical cavity 120 could be tilted by about 15 degrees with respect to the first axis 111. Other tilt angles (e.g., between 1 degree and 45 degrees with respect to the first axis 111) are contemplated and possible within the scope of the present disclosure.

In the case of system configuration 520, the tilted optical cavity could provide an asymmetric light emission patterns with respect to the first axis 111. For example, if utilized in a spinning LIDAR with a first axis 111 that is perpendicular to a ground surface, light pulses that are transmitted through the first optical window 162a would be transmitted within a "declined" first angle range 524 as compared to an "inclined" second angle range 526. With respect to a ground surface, close ranges could be instrumented only by the first angle range 524, which could result in lower resolution scanning for those regions. In other regions, where both the first angle range 524 and the second angle range 526 overlap, LIDAR data could be of a higher resolution (e.g., a so as to provide a high resolution point cloud region having roughly twice the spatial density/resolution as compared with low resolution point cloud regions).

As illustrated in FIG. 5A and FIG. 5B, system configurations 500 and 520 could include a beam stop 174 that may have asymmetric extents, which may provide an asymmetric field of view for the LIDAR system. That is, the beam stop 174 might be arranged to block a first range of angles along a first field of view (e.g., toward the first optical window 162a) and a different, second range of angles within a second field of view (e.g., toward the second optical window 162b). In other words, the light pulses emitted from the optical cavity 120 are directed into a plurality of disjoint (e.g., non-contiguous) fields of view.

Figure 5C:
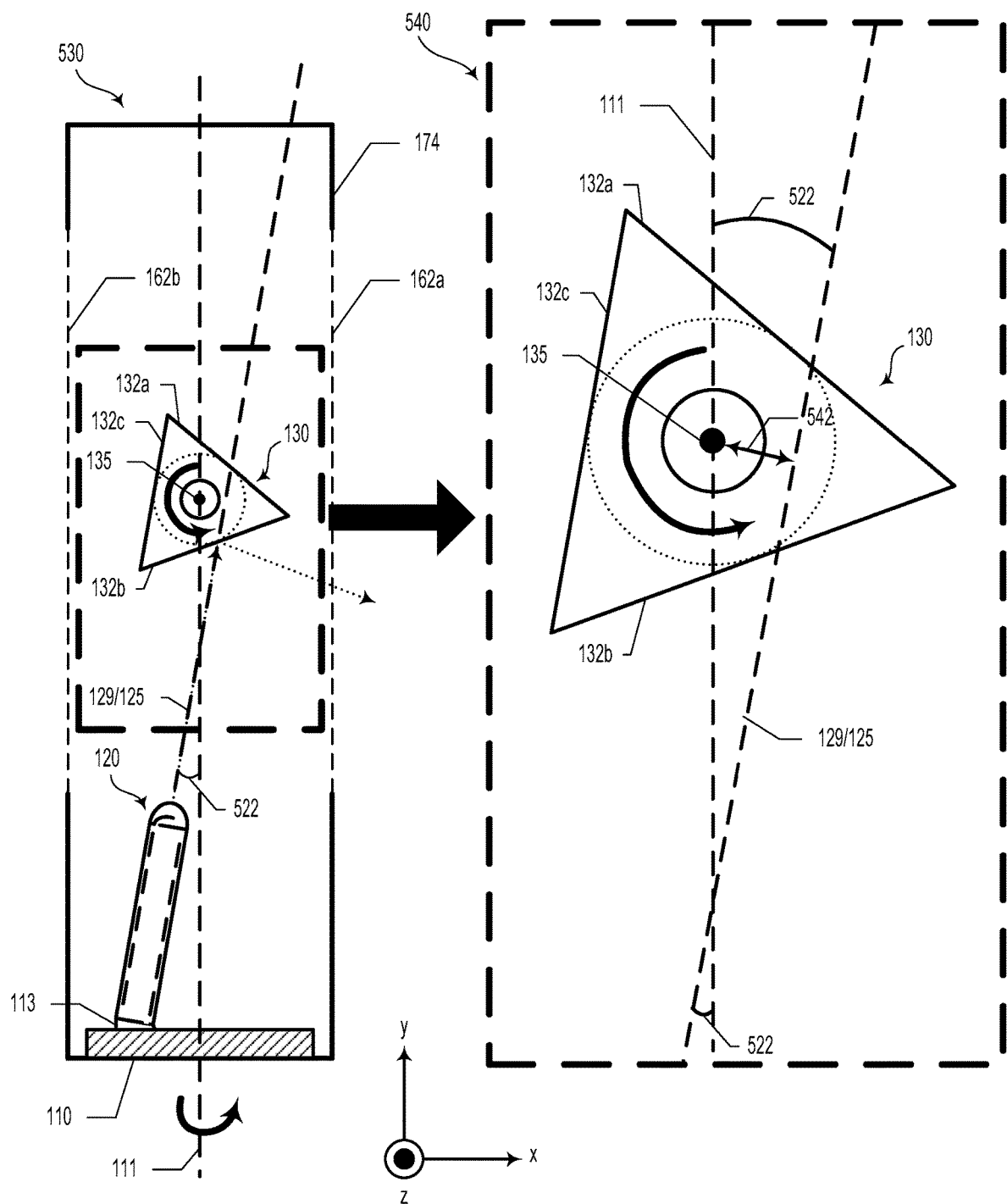
FIG. 5C illustrates a system configuration, according to an example embodiment.

FIG. 5C illustrates a system configuration 530 and a close up view 540 of the system configuration 530, according to an example embodiment. In such an embodiment, the optical cavity 120 could be disposed such that the light-receiving axis 125 and the light-emission axis 129 are tilted with respect to the first axis 111. Furthermore, the light-receiving axis 125 and/or the light-emission axis 129 do not intersect the second axis 135 (e.g., the axis about which the shaft 134 and the mirror assembly 130 are configured to rotate). For example, the light-receiving axis 125 and the light-emission axis 129 could pass within an offset distance 542 from the second axis 135. In some embodiments, the offset distance 542 could be in a range between 1 millimeter and 10 millimeters (e.g., 4 millimeters). Alternatively, the offset distance could be in a range between 5 millimeters and 10 millimeters. Other offset distances are possible and contemplated within the scope of the present disclosure.

In some embodiments, the offset distance 542 could be adjusted and/or controlled by moving the optical cavity 120 with respect to the first axis 111. For example, the optical cavity base member 113 could be tilted with respect to the first axis 111. Additionally or optionally, the optical cavity base member 113 could be moved along the rotatable base 110. In some embodiments, the optical cavity base member 113 could be configured to adjust a position and/or an angle of the optical cavity 120.

In some embodiments, the controller 150 could be operable to control the optical cavity base member 113 to adjust the position and/or angle of the optical cavity 120.

Figure 5D:
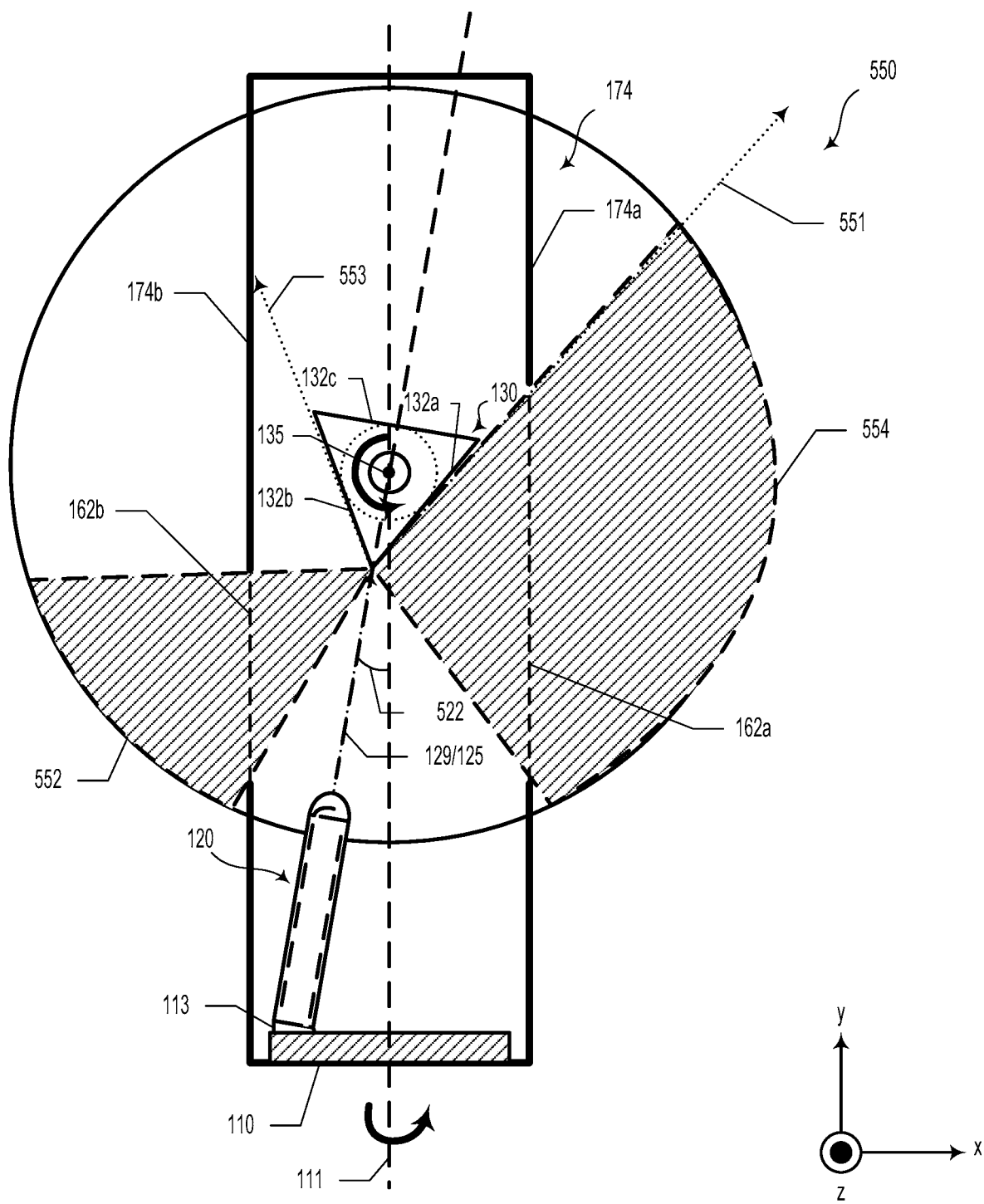
FIG. 5D illustrates a system configuration, according to an example embodiment.

FIG. 5D illustrates a system configuration 550, according to an example embodiment. At least some elements of system configuration 550 could be similar or identical to those of system configurations 500, 520, and/or 530, as illustrated and described in FIGS. 5A, 5B, and 5C. In system configuration 550, the mirror assembly 130 is positioned so as to form two reflected beams, first reflected beam 551 and second reflected beam 553. In such a scenario, the emitted light from the optical cavity 120 could be split into the two reflected beams due to interactions with a first reflective surface 132a and a second reflective surface 132b.

System configuration 550 includes beam stop 174 that has a first beam stop portion 174 and a second beam stop portion 174b. The respective beam stop portions could be arranged on substantially opposing sides of the mirror assembly 130. As illustrated, the second beam stop portion 174b could extend further toward the optical cavity 120 (e.g., in the −y-direction) than the first beam stop portion 174a. Furthermore, the first reflected beam 551 could pass through the first optical window 162a while the second reflected beam 553 may be blocked by the second beam stop portion 174b. In such a scenario, the second beam stop portion 174b may block at least a portion of the reflected light directed in the −x direction (to the left side of the system as illustrated). Accordingly, the system configuration 550 could provide a wide angle light emission pattern 554 toward the +x direction (to the right side of the system) and a narrow angle light emission pattern 552 toward the −x direction (to the left side of the system). In such embodiments, the beam stop 174 could be arranged so as to block at least some of the light emitted from the optical cavity 120 and thus provide asymmetric light emission patterns into the environment.

Figure 6:
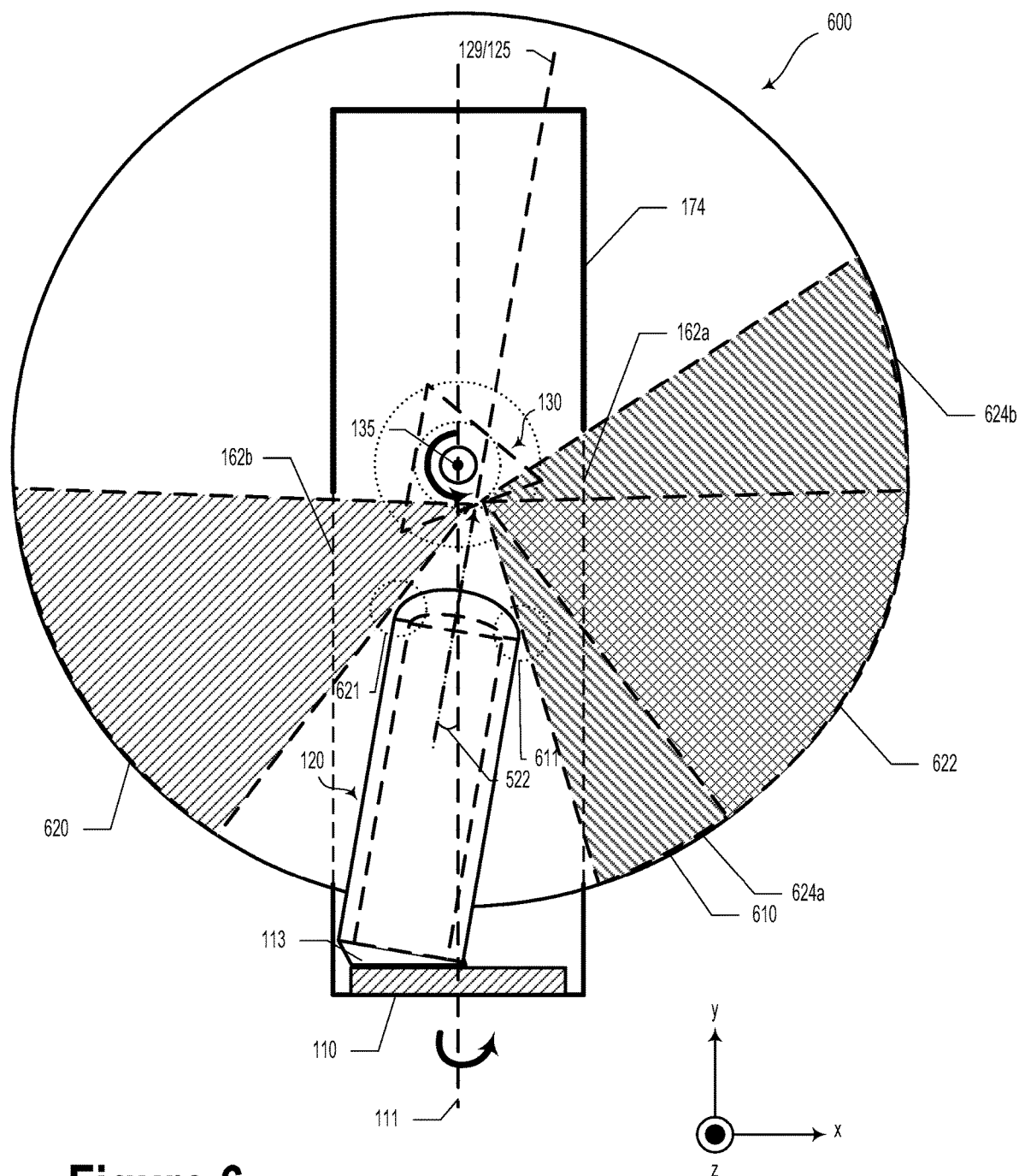
FIG. 6 illustrates a system, according to an example embodiment.

FIG. 6 illustrates a system 600, according to an example embodiment. System 600 could be similar to system 100 or system 200. Furthermore, system 600 could illustrate an emission pattern when operating the system under system configuration 530, as illustrated in FIG. 5C.

In such a scenario, the system 600 could be configured to emit an asymmetric emission pattern. For example, the asymmetric emission pattern could include a wide angle emission pattern 610 (e.g., approximately 90 degrees wide or more) via a first optical window 162a and a narrow angle light emission pattern 620 (approximately 45 degrees wide or less) with respect to the second axis 135 via the second optical window 162b. As illustrated, as the LIDAR rotates about the first axis 111, an overlap region 622 will be covered by the wide angle emission pattern 610 as well as the narrow angle light emission pattern 620. In such scenarios, the overlap region 622 may have a higher effective spatial resolution based on interleaving (e.g., scanning the region twice per revolution of the LIDAR system about the first axis 111. Additionally, the overlap region 622 could provide a better temporal scanning resolution because it is scanned twice as often (albeit at slightly different, interleaved azimuth angles). Furthermore, non-overlap regions 624a and 624b could have a lower effective spatial resolution because those regions are only scanned or instrumented once per revolution of the LIDAR system about the first axis 111. It will be understand that the asymmetric emission patterns illustrated in FIG. 6 are schematic in nature and could include different shapes, intensities, and/or angles, among other differences.

In some embodiments, the asymmetry of the emission patterns could be controlled and/or adjusted by changing a position and/or angle of the optical cavity 120. For example, a desired asymmetric emission pattern could be provided by adjusting the position or the angle of the optical cavity 120. For instance, increasing the offset distance (e.g., offset distance 542) could widen the angle range of wide angle emission pattern 610 and decrease the angle range of the narrow angle light emission pattern 620. In some embodiments, the adjustability of the asymmetric emission patterns could be limited by the geometry of the triangular prism (e.g., its size) and/or the size of the laser spot.

While FIGS. 5A, 5B, 5C, and 6 illustrate scenarios in which an emission angle range of the system 100 is limited by the size, arrangement, or extent of the optical windows 162, it will be understood that embodiments described herein could also relate to examples where the optical windows 162 do not limit the emission angle range of the light-emitter device 126 with respect to system 100. That is, in some embodiments, the emission angle range of the system 100 could be at least partially defined by the geometric extent of the optical cavity 120 itself. For example, as illustrated in FIG. 6, the optical cavity 120 may be wide enough to block at least a portion of the narrow angle emission pattern 620 and the wide angle emission pattern 610 at their respective lowest angle extents 621 and 611. Accordingly, in some embodiments, the lowest angle extents of the respective light emission patterns or fields of view could be based on the geometry of the optical cavity 120 with respect to the mirror assembly 130.

Figure 7:
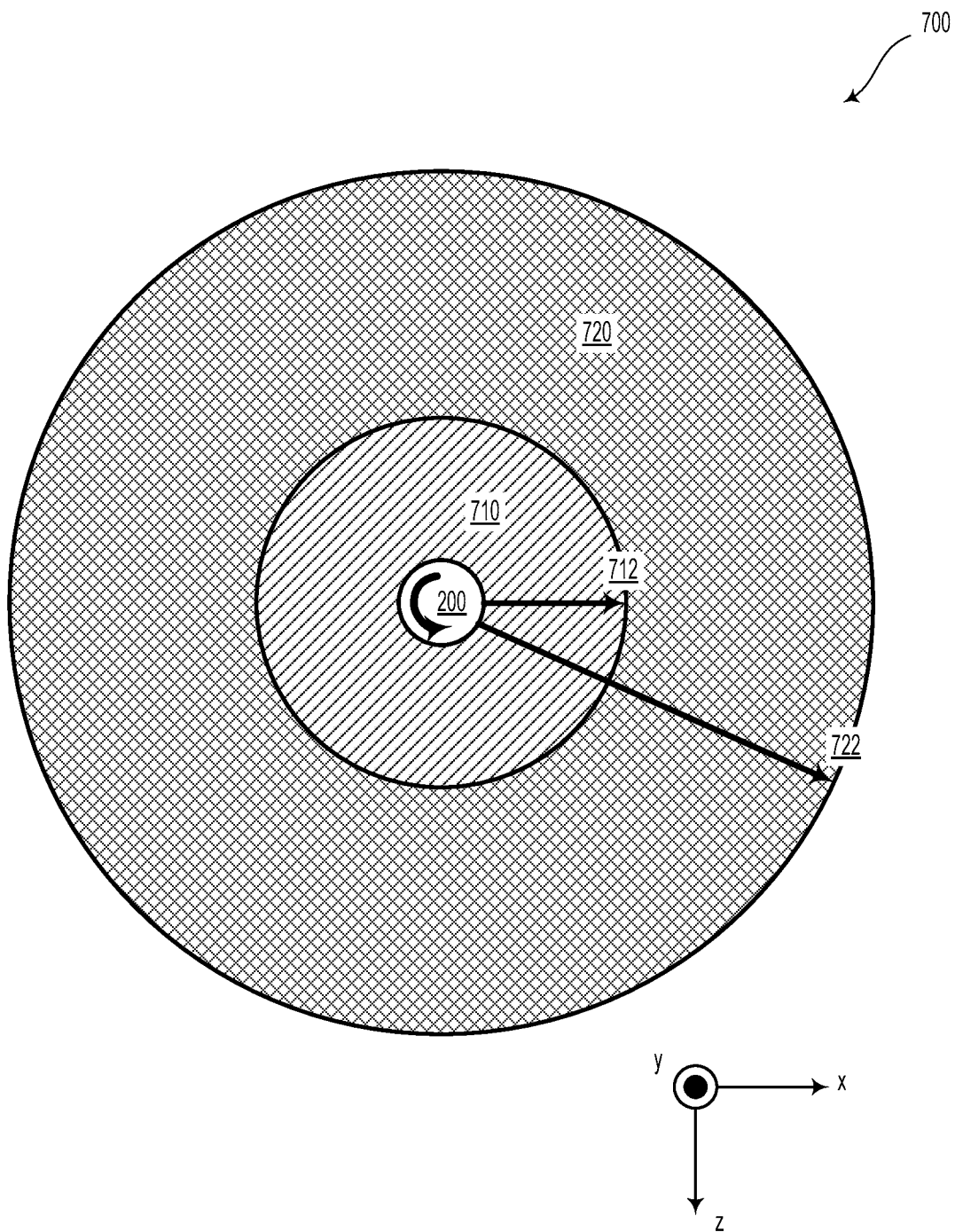
FIG. 7 illustrates an overhead view of a system, according to an example embodiment.

FIG. 7 illustrates an overhead view 700 of a system 200, according to an example embodiment. System 200 could rotate about a first axis (e.g., first axis 111 and/or the y-axis). While it is rotating about the first axis, system 200 could emit light pulses into its environment by redirecting the light pulses with the rotating mirror assembly (e.g., mirror assembly 130). FIG. 7 illustrates a light emission pattern along a ground surface. As illustrated in FIGS. 5B and 5C and corresponding to system configurations 520 and 530, respectively, an asymmetric light pattern could be emitted into the environment. For example, in cases where the light-emission axis and/or the light-detection axis are at a tilt angle to the first axis, at least two different light patterns could be observable along a ground surface. For example, between a location of the system 200 and a first distance 712, the light emission pattern could have a first resolution, which could include a relatively low spatial resolution of light pulses (e.g., low resolution light emission pattern 710)). Between the first distance 712 and a second distance 722, the light emission pattern could include a second resolution, which could be a relatively high spatial resolution of light pulses (e.g., high resolution light emission pattern 720). In some embodiments, the second resolution could be about twice that of the first resolution. The differences in the first and second resolution result, at least in part, from the asymmetry between different portions of the light emission pattern. That is, for some emission angles, only about half of the total light pulses (corresponding to emission out one of the two optical windows) can physically be provided to the low resolution light emission pattern 710. For other emission angles, light pulses can be transmitted through both of the optical windows toward the high resolution light emission pattern 720.

Figure 8:
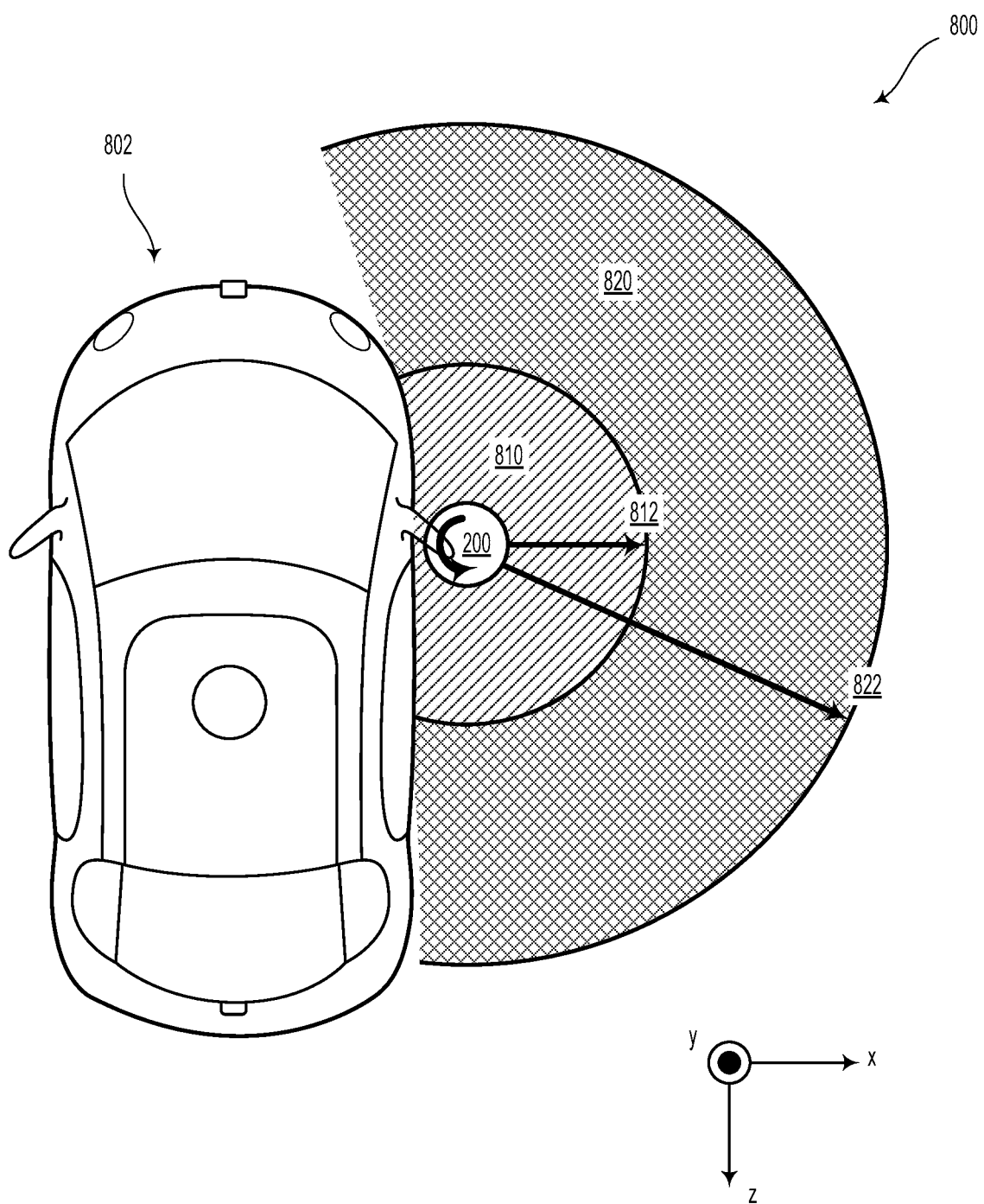
FIG. 8 illustrates an overhead view of a vehicle, according to an example embodiment.

FIG. 8 illustrates an overhead view 800 of a vehicle 802, according to an example embodiment. In some embodiments, the system 200 could be mounted on a vehicle 802, which could include an automobile, a truck, a forklift, an aerial vehicle, or a boat. Other types of vehicles are possible and contemplated. As illustrated in FIG. 8, the system 200 could be mounted to a side mirror of the vehicle 802.

Similar to the overhead view 700 as illustrated in FIG. 7, overhead view 800 could illustrate asymmetric light emission patterns. For example, the overhead view 700 could include a low resolution light emission pattern 810 between the system 200 and a first distance 812. Furthermore, the overhead view 700 could include a high resolution light pattern 820 between a second distance 822 and the first distance. It will be understood that system 200 could be coupled to other locations in and around the vehicle 802.

Figure 11:
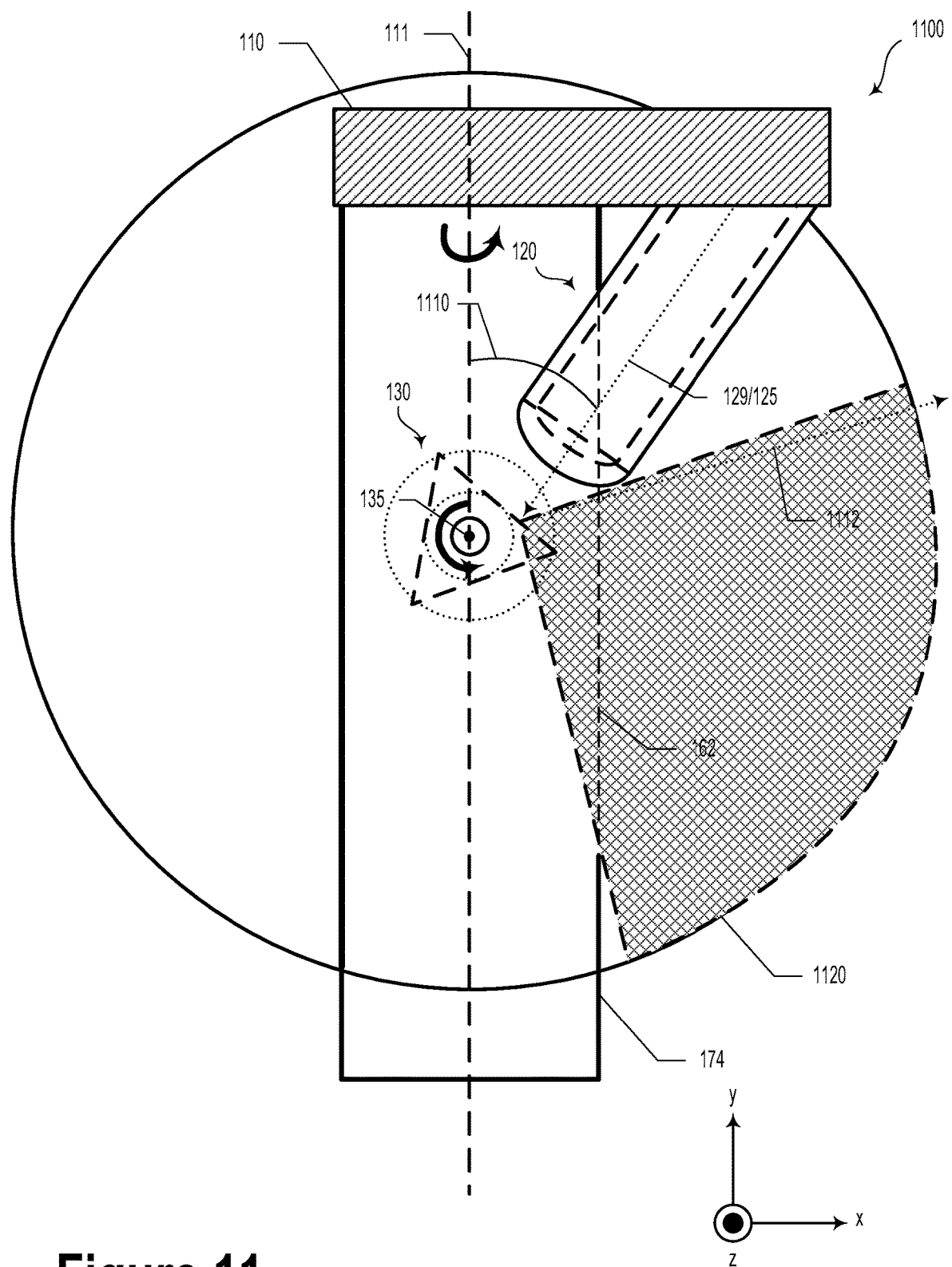
FIG. 11 illustrates a system configuration, according to an example embodiment.

FIG. 11 illustrates a system configuration 1100, according to an example embodiment. System configuration 1100 could be similar to system configurations 500, 520, 530, and/or 550 and/or system 600. For example, system configuration 1100 could include an optical cavity 120 that is coupled to a rotatable base 110. The rotatable base 110 is configured to rotate about a first axis 111. System configuration 1100 could also include a mirror assembly 130. The mirror assembly 130 could be, for example, two-, three- or four-sided shape configured to rotate about a second axis 135.

In some embodiments, the optical cavity 120 could be arranged such that an angle 1110 between the first axis 111 and the light-receiving axis 125 and/or the light-emission axis 129 is around 30 to 45 degrees. Furthermore, as illustrated, the reflected beam 1112 could be provided within an emission pattern 1120 between approximately +15 degrees above horizontal and −80 degrees below horizontal. In some embodiments, such a system configuration could be beneficial because it provides a substantially wider field of view near horizontal angles (e.g., ±15 degrees from horizontal) where many applications need the longest range information.

While a single-sided light-emission scenario is illustrated (e.g., reflected beam 1112 is only reflected in the +x direction), it will be understood that double-sided light-emission scenarios (e.g., where reflected beams can be directed in the +x and −x directions) are possible and contemplated.

III. Example Methods

Figure 9:
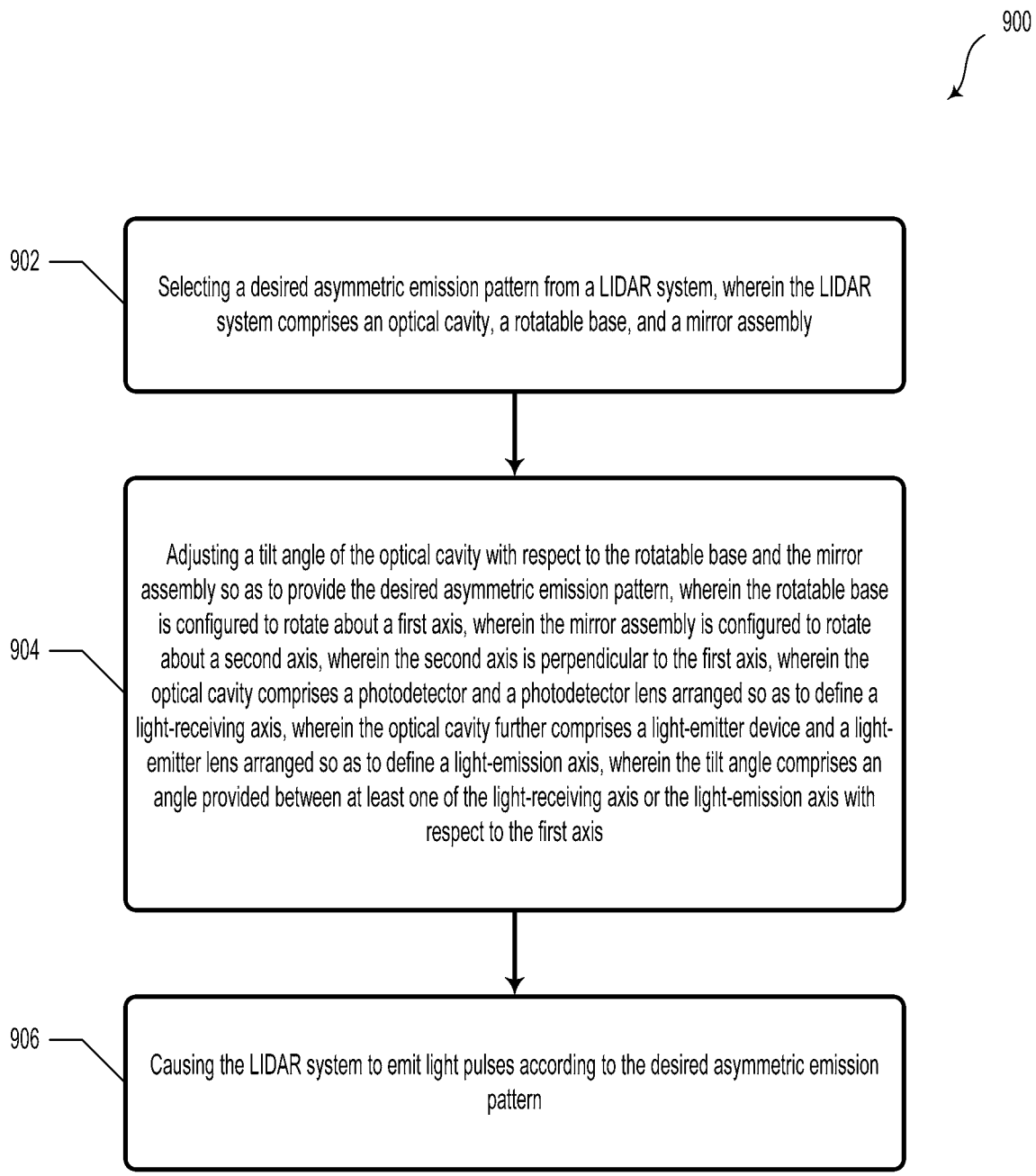
FIG. 9 illustrates a method, according to an example embodiment.

FIG. 9 illustrates a method 900, according to an example embodiment. It will be understood that the method 900 may include fewer or more steps or blocks than those expressly illustrated or otherwise disclosed herein. Furthermore, respective steps or blocks of method 900 may be performed in any order and each step or block may be performed one or more times. In some embodiments, some or all of the blocks or steps of method 900 may be carried out by controller 150 and/or other elements of systems 100 and system 200 as illustrated and described in relation to FIGS. 1 and 2, respectively.

Block 902 includes selecting a desired asymmetric emission pattern to be emitted from a LIDAR system. The LIDAR system could include system 100 and/or system 200 as illustrated and described herein. The LIDAR system includes an optical cavity (e.g., optical cavity 120), a rotatable base (e.g., rotatable base 110), and a mirror assembly (e.g., mirror assembly 130).

In some embodiments, selecting the desired asymmetric emission pattern could include determining a desired tilt angle of the optical cavity with respect to the rotatable base. Selecting the desired asymmetric emission pattern could additionally or alternatively include selecting a desired offset distance between the light-receiving axis and/or the light-emission axis with respect to the axis of rotation of the mirror assembly (e.g., the second axis 135). The desired offset distance could be selected based on a desired balance of emission light between first and second sides of the LIDAR system. In some embodiments, the respective offset distances for the light-receiving axis and the light-emission axis need not be the same. As an example, the offset distance for the light-receiving axis could be between 1 mm and 4 mm and the offset distance for the light-emission axis could be between 2 mm and 6 mm. Other offset distances are possible and contemplated.

In some embodiments, offsetting may be beneficial because if the mirror size is constrained, in some scenarios, the whole beam might not get reflected into the scene for the whole range of mirror angles that cover the field of view. However, by offsetting the receiving and transmit beams, the field of view can be traded off between losses near the top or bottom of the field of view. Additionally, selecting different offset distances for the receiving and transmit beams can adjust the balance of light between the front and back of the LIDAR near the top of the field of view when light interacts with two different reflective surfaces of the mirror assembly.

Block 904 includes adjusting a tilt angle of the optical cavity with respect to the rotatable base and the mirror assembly so as to provide the desired asymmetric emission pattern. The rotatable base is configured to rotate about a first axis. The mirror assembly is configured to rotate about a second axis. The second axis is substantially perpendicular to the first axis (e.g., within 1 to 10 degrees of perpendicular). The optical cavity includes a photodetector and a photodetector lens arranged so as to define a light-receiving axis. The optical cavity also includes a light-emitter device and a light-emitter lens arranged so as to define a light-emission axis. The tilt angle includes an angle provided between at least one of the light-receiving axis or the light-emission axis with respect to the first axis.

Adjusting the tilt angle could include, for example, adjusting a position and/or angle of a base member (e.g., optical cavity base member 113). In such scenarios, the angle of the base member could be adjusted by hand (e.g., a set screw or another type of manual adjustment) or in a semiautomatic manner (e.g., by adjusting an actuator associated with the optical cavity base member 113). It will be understood that in some embodiments, the tilt angle could be designed and/or selected before or at the time of manufacture and could be fixed once the parts are manufactured and assembled. In such scenarios, tilt angle adjustments might not be possible.

Additionally or alternatively, the method could include adjusting an offset distance (e.g., offset distance 542) according to the desired asymmetric emission pattern. Adjusting the offset distance could include further adjusting the position and/or angle of the base member. Again, in some embodiments, the offset distance could be designed and/or selected at the time of manufacture and thus might not be adjustable while the optical system is in use.

Optionally, the method could include adjusting and/or selecting a beam stop arrangement. Adjusting the beam stop arrangement could include, for example, orienting the beam stop (e.g., beam stop 174) so as to block at least a portion of the emitted light that interacts from the mirror. For example, as illustrated in FIG. 6, the beam stop 174 could block at least some upward-pointing beams of light from being emitted into the environment. Furthermore, the beam stop 174 could be arranged so as to form an asymmetric field of view towards a first optical window as compared to the field of view towards a second optical window. That is, the beam stop 174 could extend further (e.g., lower) on a first side of the mirror assembly as opposed to the second side. In such a fashion, the beam stop 174 can be adjusted to change the top-most angles of the respective first and second fields of view.

Block 906 includes causing the LIDAR system to emit light pulses according to the desired asymmetric emission pattern. In some embodiments, causing the LIDAR system to emit light pulses could include, for example, causing a laser pulser circuit to provide one or more current pulses to the light-emitter device so as to emit the light pulses.

Figure 10:
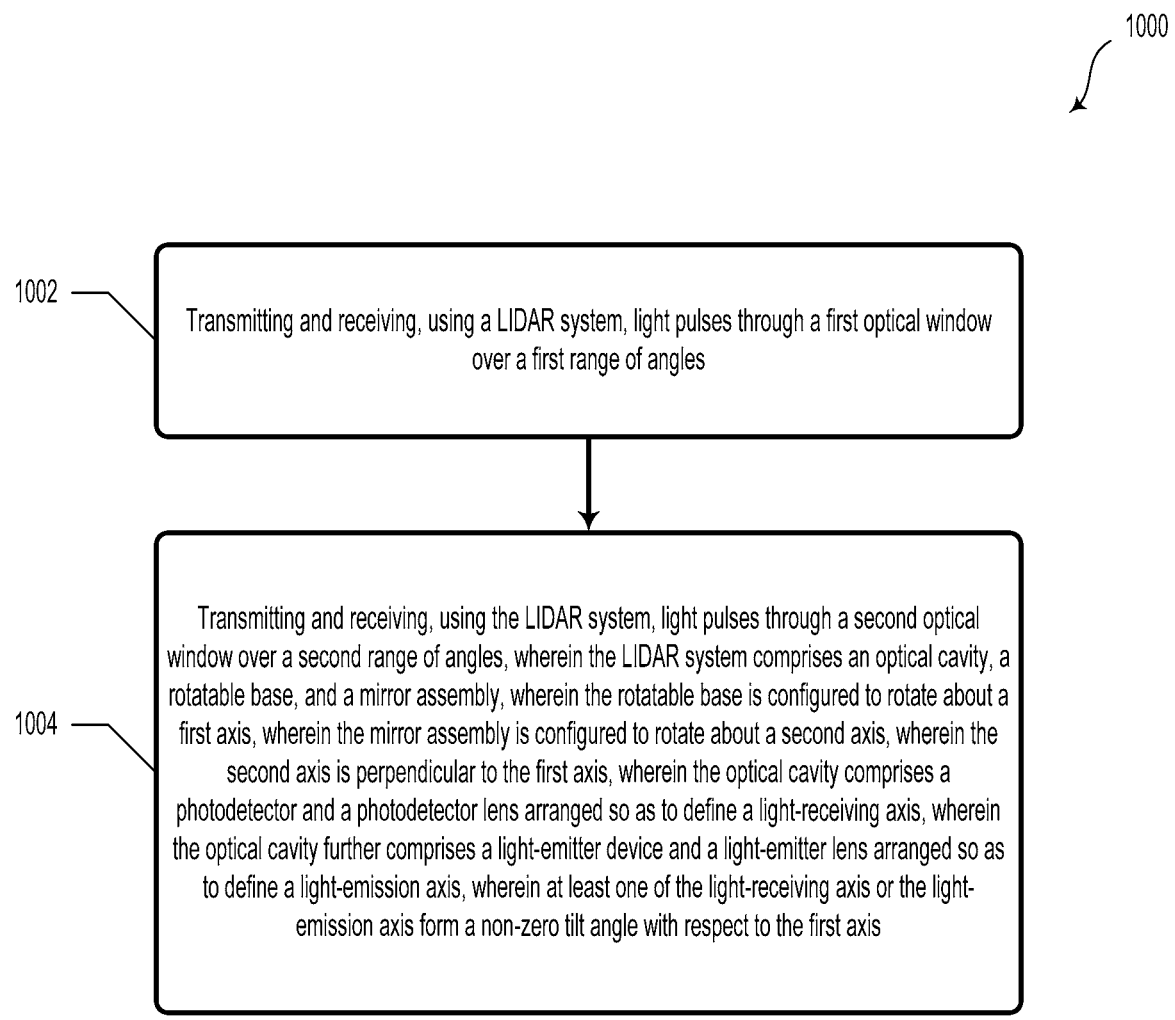
FIG. 10 illustrates a method, according to an example embodiment.

FIG. 10 illustrates a method 1000, according to an example embodiment. It will be understood that the method 1000 may include fewer or more steps or blocks than those expressly illustrated or otherwise disclosed herein. Furthermore, respective steps or blocks of method 1000 may be performed in any order and each step or block may be performed one or more times. In some embodiments, some or all of the blocks or steps of method 1000 may be carried out by controller 150 and/or other elements of systems 100 and system 200 as illustrated and described in relation to FIGS. 1 and 2, respectively.

Block 1002 includes transmitting and receiving, using a LIDAR system, light pulses through a first optical window over a first range of angles. The LIDAR system could include an optical cavity (e.g., optical cavity 120), a rotatable base (e.g., rotatable base 110), and a mirror assembly (e.g., a mirror assembly 130). The rotatable base is configured to rotate about a first axis (e.g., first axis 111). The mirror assembly is configured to rotate about a second axis (e.g., second axis 135). The second axis is substantially perpendicular to the first axis. The optical cavity includes a photodetector and a photodetector lens arranged so as to define a light-receiving axis. The optical cavity includes a light-emitter device and a light-emitter lens arranged so as to define a light-emission axis. At least one of the light-receiving axis or the light-emission axis forms a non-zero tilt angle with respect to the first axis.

Block 1004 includes transmitting and receiving, using the LIDAR system, light pulses through a second optical window over a second range of angles.

In reference to FIG. 5C, the light-receiving axis 125 and/or the light-emission axis 129 could form a tilt angle 522 with respect to the first axis 111. For example, the optical cavity 120 could be tilted at the tilt angle 522. Additionally or alternatively, the optical cavity 120 could be disposed such that the light-emission axis 129 and light-receiving axis 125 form an offset distance 542 with respect to the second axis 135. As described with reference to system configurations 520 and 530, tilting the optical cavity 120 so as to form tilt angle 522 and/or offset distance 542 could provide an asymmetric light emission pattern.

In such scenarios, referring to FIG. 6, light pulses could be transmitted and/or received through the first optical window (e.g., optical window 162a) over a wider range of angles (e.g., wide angle emission pattern 610) as compared to light pulses transmitted and/or received through the second optical window (e.g., optical window 162b) over a narrow range of angles (e.g., narrow angle emission pattern 620). As an example, the wide angle emission pattern 610 could include an angle range of over 90 degrees. The narrow angle emission pattern 620 could include an angle range of less than 45 degrees. Other angle ranges are contemplated and possible.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a rotatable base configured to rotate about a first axis;
a mirror assembly comprising a plurality of reflective surfaces, wherein the mirror assembly is configured to rotate about a second axis, wherein the second axis is substantially perpendicular to the first axis;
an optical cavity coupled to the rotatable base, wherein the optical cavity comprises:
a photodetector and a photodetector lens arranged so as to define a light-receiving axis; and
a light-emitter device and a light-emitter lens arranged so as to define a light-emission axis, wherein at least one of the light-receiving axis or the light-emission axis forms a tilt angle with respect to the first axis, wherein the light-emitter device is configured to emit light pulses that interact with the mirror assembly such that the light pulses are directed into a plurality of disjoint fields of view; and
a housing having a plurality of windows, wherein the light pulses are emitted toward an environment of the system through the plurality of windows, wherein the light pulses emitted through the plurality of windows form an asymmetric light emission pattern.

2. The system of claim 1, wherein the plurality of reflective surfaces comprises three reflective surfaces arranged symmetrically about the second axis such that the mirror assembly has a triangular prism shape.

3. The system of claim 1, further comprising a prismatic lens configured to refract the light pulses.

4. The system of claim 1, wherein at least a portion of the light pulses are reflected back toward the system and received by the photodetector so as to determine at least one of a range or a point cloud.

5. The system of claim 1, wherein the light pulses emitted through a first window of the plurality of windows are emitted within a first emission angle range, and wherein the light pulses emitted through a second window of the plurality of windows are emitted within a second emission angle range, wherein the asymmetric light emission pattern is provided by the first emission angle range being different from the second emission angle range.

6. The system of claim 1, wherein at least one of the light-receiving axis or the light-emission axis does not intersect the second axis.

7. The system of claim 1, wherein the plurality of reflective surfaces comprises four reflective surfaces arranged symmetrically about the second axis such that the mirror assembly has a square or rectangular cross-section.

8. The system of claim 1, wherein the tilt angle is between 15-30 degrees.

9. The system of claim 1, wherein at least one of the light-receiving axis or the light-emission axis passes within an offset distance from the second axis, wherein the offset distance is between 0-10 millimeters.

10. The system of claim 9, wherein at least one of the offset distance or the tilt angle is adjustable based on a desired light emission pattern.

11. The system of claim 9, wherein at least one of the offset distance or the tilt angle is selected so as to provide a higher resolution scan of a first portion of a field of view as compared to that of an untilted optical cavity.

12. The system of claim 1, wherein the light-receiving axis and the light-emission axis are substantially parallel to one another.

13. The system of claim 1, further comprising at least one baffle, wherein the at least one baffle is configured to reduce stray light within the optical cavity.

14. The system of claim 1, wherein the rotatable base is configured to rotate about the first axis at between 200 revolutions per minute and 800 revolutions per minute, and wherein the mirror assembly is configured to rotate about the second axis at between 20,000 revolutions per minute to 40,000 revolutions per minute.

15. The system of claim 1, further comprising at least one beam stop, wherein the at least one beam stop is configured to block at least a portion of the light pulses so as to provide the asymmetric light emission pattern in the environment of the system.

16. A method comprising:
selecting a desired asymmetric emission pattern to be emitted from a LIDAR system, wherein the LIDAR system comprises an optical cavity, a rotatable base, and a mirror assembly;
adjusting a tilt angle of the optical cavity with respect to the rotatable base and the mirror assembly so as to provide the desired asymmetric emission pattern, wherein the rotatable base is configured to rotate about a first axis, wherein the mirror assembly is configured to rotate about a second axis, wherein the second axis is substantially perpendicular to the first axis, wherein the optical cavity comprises a photodetector and a photodetector lens arranged so as to define a light-receiving axis, wherein the optical cavity further comprises a light-emitter device and a light-emitter lens arranged so as to define a light-emission axis, wherein the tilt angle comprises an angle provided between at least one of the light-receiving axis or the light-emission axis with respect to the first axis; and
causing the LIDAR system to emit light pulses according to the desired asymmetric emission pattern.

17. A method comprising:
transmitting and receiving, using a LIDAR system, light pulses through a first optical window over a first range of angles; and
transmitting and receiving, using the LIDAR system, light pulses through a second optical window over a second range of angles, wherein the LIDAR system comprises an optical cavity, a rotatable base, and a mirror assembly, wherein the rotatable base is configured to rotate about a first axis, wherein the mirror assembly is configured to rotate about a second axis, wherein the second axis is substantially perpendicular to the first axis, wherein the optical cavity comprises a photodetector and a photodetector lens arranged so as to define a light-receiving axis, wherein the optical cavity further comprises a light-emitter device and a light-emitter lens arranged so as to define a light-emission axis, wherein at least one of the light-receiving axis or the light-emission axis forms a non-zero tilt angle with respect to the first axis.

* * * * *